United States Patent [19]
Marandi

[11] Patent Number: 5,301,710
[45] Date of Patent: Apr. 12, 1994

[54] AUTOMATIC FLUID FLOW CONTROL DEVICE, SYSTEM AND METHOD

[75] Inventor: Ali Marandi, Irvine, Calif.

[73] Assignee: Griswold Controls, Irvine, Calif.

[21] Appl. No.: 62,895

[22] Filed: May 18, 1993

Related U.S. Application Data

[63] Continuation-in-part of Ser. No. 911,206, Jul. 9, 1992, Pat. No. 5,230,366.

[51] Int. Cl.$^5$ .............................................. F16K 11/00
[52] U.S. Cl. .................................... 137/15; 137/240
[58] Field of Search ................. 137/15, 240; 52/240.1

[56] References Cited

U.S. PATENT DOCUMENTS 5,076,310 12/1991 Barenburg ............................ 137/15

FOREIGN PATENT DOCUMENTS

WO90/01657 2/1990 PCT Int'l Appl. .

Primary Examiner—John C. Fox
Attorney, Agent, or Firm—Lyon & Lyon

[57] ABSTRACT

The system of the present application include a plurality of flow control devices. The device of the present application, an automatic flow control device, provides means for maintaining a constant flow rate of strained fluid despite varying differential pressures and employs a combination of a unitary body with a ball valve assembly, a strainer assembly, and a flow control valve assembly. The unitary body provides a compact valve with minimum threaded joints and access to the various components thereof with minimum disassembly thereby enabling, for example, changing the flow rate within the device without taking the device off-line or removing various components to allow the device, and the system, to be flushed by subjecting it to excessive flow. The methods of the present application relate to the installation and use of the system.

5 Claims, 4 Drawing Sheets

5,301,710

AUTOMATIC FLUID FLOW CONTROL DEVICE, SYSTEM AND METHOD

INTRODUCTION

This application is a continuation-in-part of application Ser. No. 07/911,206 entitled Automatic Fluid Flow Control Device filed Jul. 9, 1992, now U.S. Pat. No. 5,230,366.

FIELD OF THE INVENTION

The present invention relates to fluid flow control devices, particularly automatic fluid flow control devices.

BACKGROUND

Fluid flow control assemblies of the prior art generally comprise two or more components. The components, as many as six or more, are pieced together in series. The assemblies require many joints, usually threaded, and usually have relatively long lengths. These are major drawbacks of the prior art assemblies because the more threaded joints a device has, the longer it takes to install the device and the higher the risks of leaks occurring in the device. In addition, the longer the length of a device, the more installation room it requires.

Another problem with prior art assemblies is that a plumbing system incorporating a prior art assembly is not easily subjected to excessive flow to flush the system without clogging the various components. Certain components of the assembly impede flow through the assembly and, therefore, would impede a high pressure flow therethrough for flushing. Furthermore, the impeding components of the prior art assemblies are not easily removable. Indeed, some prior art assemblies must be taken off-line to remove or replace such components.

SUMMARY OF THE INVENTION

The present invention relates to a plumbing system which incorporates a plurality of automatic fluid flow control devices each having a unitary body which contains at least one flow member (such as a strainer or a flow control cartridge or both). The automatic fluid flow control devices may be installed in a plumbing system. Preferably, the flow member (e.g. strainer or flow control cartridge or both) is removed prior to installation. Once everything is connected in the plumbing system, it may then be provided with excessive flow to flush out the system and then the flow member(s) may be replaced or installed. In this manner the system can be flushed without clogging the flow member(s) prior to placing the system in regular operation.

The automatic fluid flow control device includes, among other things, a ball valve for controlling gross fluid flow through the device, a strainer member for straining fluids upon entering the device, and a pressure compensating flow control valve which provides for constant fluid flow through and out of the device. The flow control valve is pre-set and, therefore, the flow through the device is tamper resistant. These components are provided in a compact assembly which allows easy access to each of the components for cleaning and/or replacing and which embodies the device of the present invention.

The novel design and construction of an automatic fluid flow control device according to the present invention provides a singular body which minimizes both (1) the number of threaded joints (thereby minimizing the time it takes to install the device and the risks of leaks in the device) and (2) the size of the device (thereby minimizing the space needed for installation).

Accordingly, a principal object of this invention is to provide an improved automatic fluid flow control system and an improved automatic fluid flow control device.

It is also an object of this invention to provide a plumbing system comprising a plurality of improved automatic fluid flow control devices.

It is another object of this invention to provide an automatic fluid flow control device in which the flow setting is tamper resistant because the flow control valve is pre-set.

It is a further object of the present invention to provide an automatic fluid flow control device in which the flow control valve is a pressure compensating valve.

An additional object of the present invention is to provide an automatic fluid flow control device in which any flow member is easily accessible and replaceable without taking the device off line.

It is still another object of the present invention to provide an automatic fluid flow control device in which any flow member can be removed and left out before or during installation.

The present invention relates to a fluid flow control system having an automatic fluid flow control device which provides a constant fluid flow even though a variety of supplied pressures occur. The configuration of the body of the device provides for a compact size and easy access to various components of the device including a fluid strainer and a flow control cartridge which may be removed and/or replaced without taking the device off-line. With the strainers and flow control cartridges removed from the devices in the system, excessive fluid flow may be provided to the system to flush it. Once flushing is completed, the strainers and flow control cartridges may be replaced or installed. The device also includes access ports which provide for testing the pressure and/or temperature in the device at various locations.

The structure of a valve according to the present invention is such that when fluid flows into the device, it first encounters a positionable ball valve. The ball valve, depending on its position, either prevents the fluid from entering the rest of the device or allows the fluid to flow into the rest of the device. If the fluid flows into the rest of the device, it then encounters a fluid strainer member.

The fluid strainer member strains and filters the fluid for preventing contaminants from entering the rest of the device and/or exiting from the device. The fluid strainer member is easily accessible and may be easily removed to allow for cleaning, replacement, and/or flushing. Once the fluid passes through the strainer, it encounters an automatic flow control valve.

The automatic flow control valve provides for a constant fluid flow rate despite a varying differential pressure. A variety of flow control cartridges may be used in the flow control valve depending on the flow rate desired. Suitable automatic flow control cartridges are available from Griswold Controls, Irvine, California, which may be of the type disclosed in U.S. Pat. No. 3,752,183. The automatic flow control valve is positioned in the device of the present invention such that it is easily accessible and may be removed to allow a high pressure flush of the device and/or replaced with a different flow control valve without taking the device off-line. Once the fluid passes through the flow control valve, it exits the device at a selected flow as determined by the cartridge used.

DETAILED DESCRIPTION OF THE PREFERRED EMBODIMENT

The present invention relates to a method of plumbing a facility and the resultant plumbing system, and the valve involved. The plumbing system comprises a plurality of automatic flow control devices (described in detail below) which contain a flow member to provide strained fluid flow at a selected flow rate regardless of the supplied fluid flow pressure. The flow member comprises a strainer or an automatic flow control cartridge or both. The devices enable easy access to and removal and installation of any flow member of the device. Removal of the flow member(s) enables an excessive fluid flow to be supplied to the system to flush the system without clogging these components.

Figures 1A, 1B:
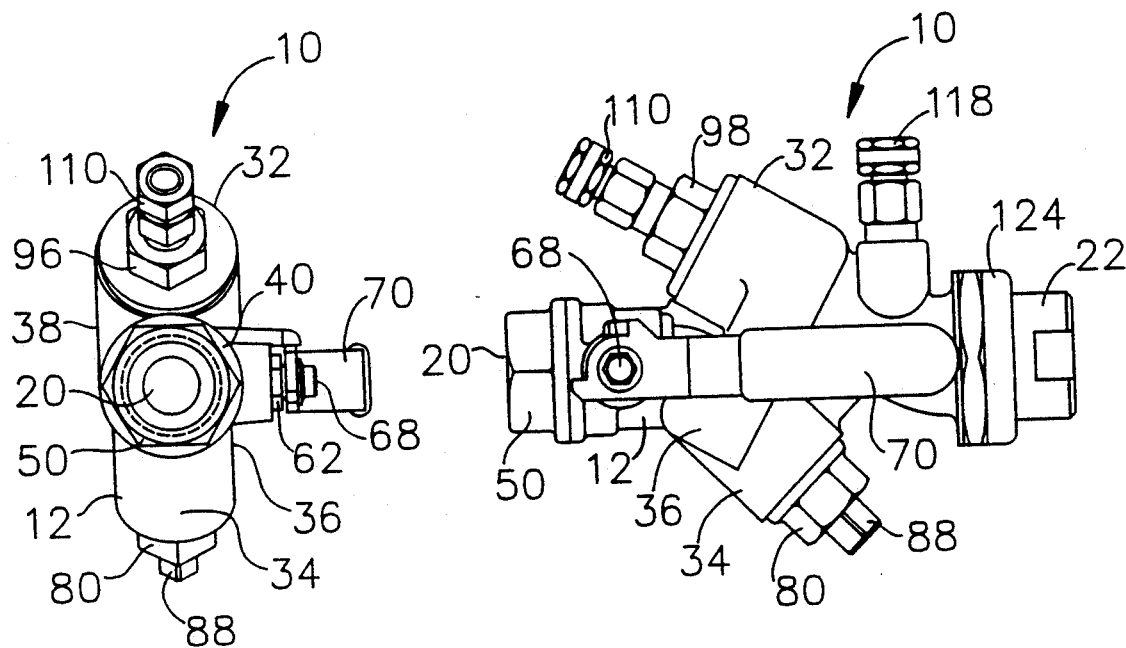
FIG. 1A is an elevational view of the front of an assembled preferred embodiment of an automatic fluid flow control device of the present invention.
FIG. 1B is an elevational view of the left side of the device of FIG. 1A.
Figure 2:
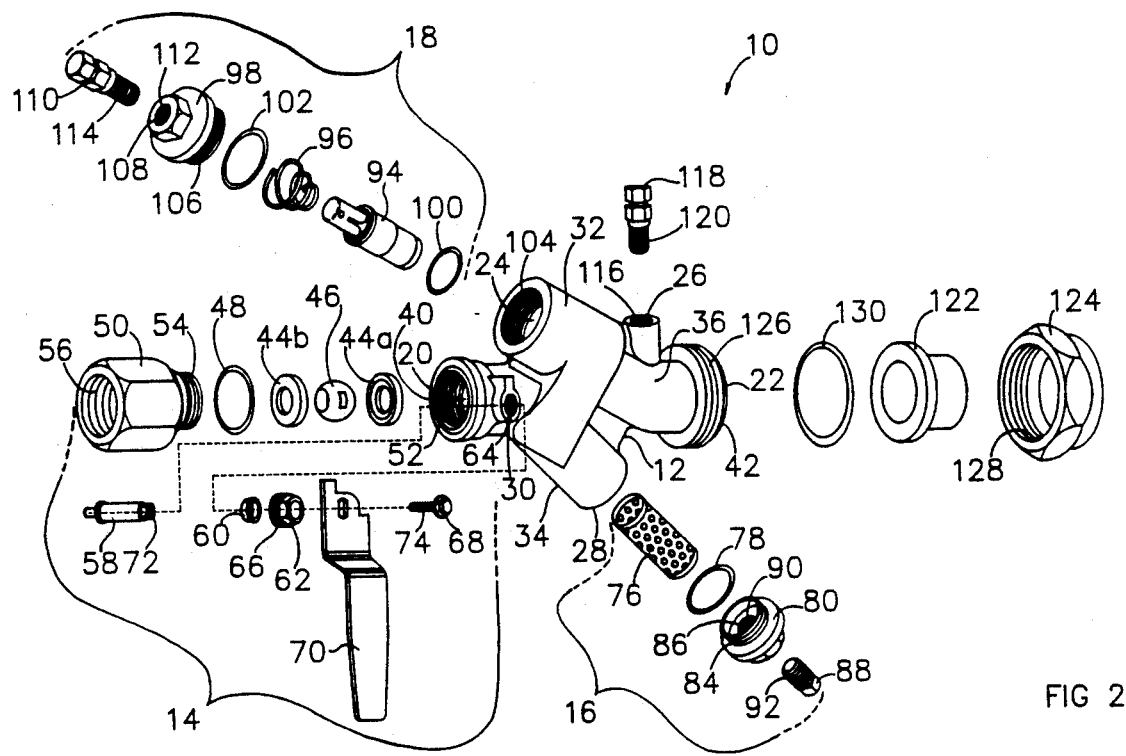
FIG. 2 is an exploded view of the device of FIG. 1A showing the components of the device and their spacial relationship.
Figure 3:
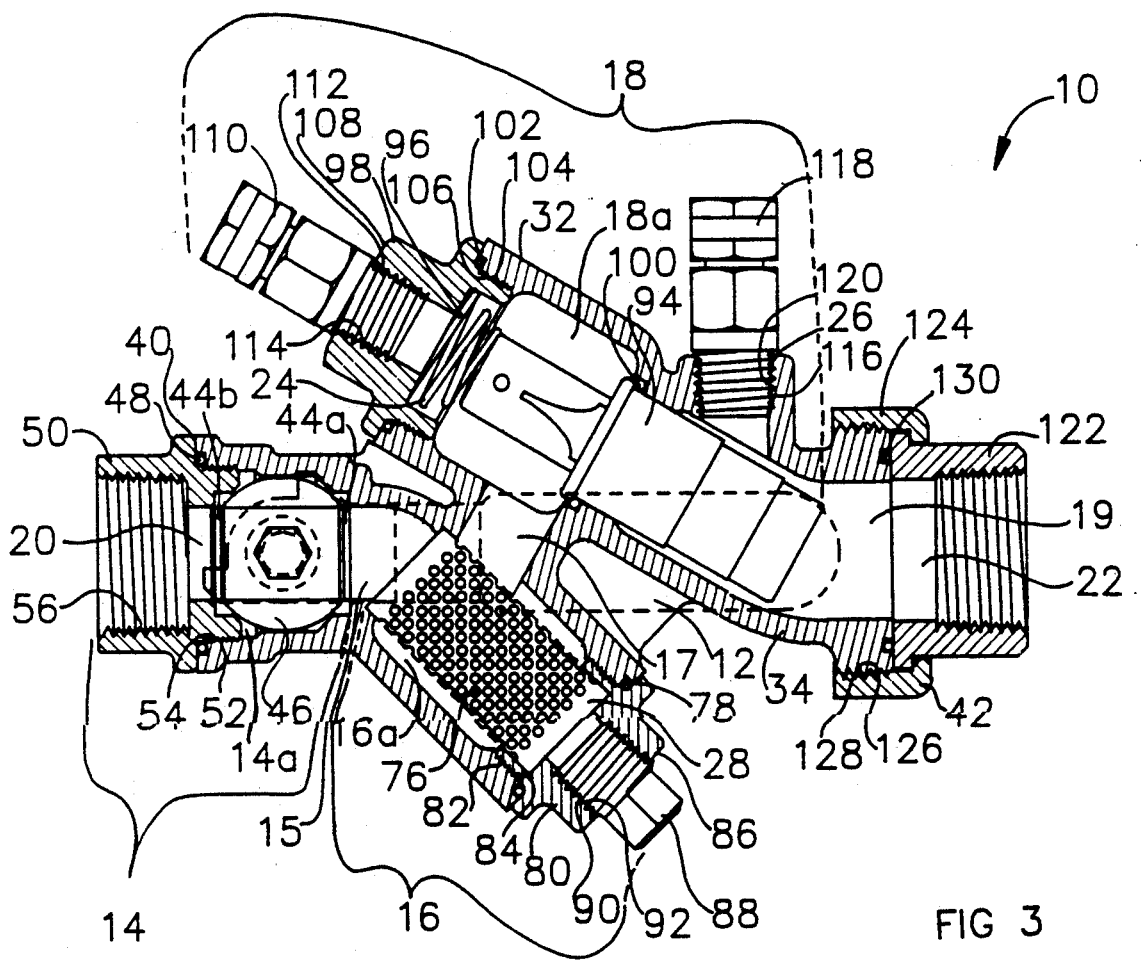
FIG. 3 is a cross-sectional view illustrating the internal configuration of the device of FIG. 1A.

A description of the automatic flow control devices will be helpful. Turning to the drawings, FIGS. 1A, 1B, 2, and 3 show a preferred embodiment of the flow control device of the present invention in the form of an automatic fluid flow control device 10. As best shown in FIGS. 2 and 3, the device 10 comprises four main components: a valve body 12, a positionable ball valve assembly 14, a removable strainer assembly 16, and a removable flow control valve assembly 18.

As best shown in FIG. 2, the valve body 12 includes six orifices: an inlet orifice 20, an outlet orifice 22, a flow control valve orifice 24, a test valve orifice 26, a strainer orifice 28, and a ball valve fitting orifice 30. The valve body 12 also includes: a top side 32, a bottom side 34, a front side 36, a back side 38 (FIG. 1B), a left side 40, and a right side 42.

Furthermore, as shown in FIG. 3, the valve body 12 comprises several internal channels for directing fluid flow through the device 10. These channels include: a ball valve channel 14a; a ball valve-strainer connecting channel 15; a strainer channel 16a; a strainer-flow control valve connecting channel 17; a flow control valve channel 18a; and an outlet channel 19. When the device 10 is assembled, as in FIG. 3, the ball valve channel 14a comprises the location of the ball valve assembly 14, the strainer channel 16a comprises the location of the strainer assembly 16, and the flow control valve channel 18a comprises the location of the flow control valve assembly 18. The channels 14a, 15, 16a, 17, 18a, and 19, together form a fanciful backwards "Z" configuration with channels 19 and 18a comprising a top arm of the Z, channel 17 comprising a body of the Z, and channels 16a, 15, and 14a comprising a bottom arm of the Z.

A general description of the positioning and operation of the device 10 will be helpful to understanding the detailed description of the device 10 given below. The device 10 is connected between two pipes or lines with the ball valve fitting orifice 20 attached to a pipe or line which is to be regulated and the outlet orifice 22 is attached to on outlet pipe. Turning to FIG. 3, the general operation of the device 10 involves the following seven steps:

(1) A fluid flow of varying pressures enters the device 10 through the inlet orifice 20 at the left side 40.
(2) The fluid flow encounters the ball valve assembly 14 which, depending upon its position, either allows the fluid to enter or prevents the fluid from entering the device 10.
(3) If the fluid enters the device 10, it then passes through the connecting channel 15 to the strainer assembly 16.
(4) The fluid flow passes through the strainer assembly 16 which strains debris out of the fluid flow so it neither passes through nor out of the rest of the device 10 particularly the removable flow control valve assembly 18.
(5) The strained fluid then passes through the connecting channel 17 to the flow control valve assembly 18.
(6) The flow control valve assembly 18 automatically regulates the fluid flow such that the fluid exits the valve assembly 18 at a constant, pre-selected, rate.
(7) The strained and regulated fluid flow then passes through the outlet channel 19 and the outlet orifice 22, and exits the device 10.

Thus, the device 10 provides automatically controlled fluid flow from fluid supplied at varying pressures in a very compact and simple apparatus.

Turning to the Figures, the device 10, and particularly the configuration of the valve body 12, in more detail, the inlet orifice 20 and the outlet orifice 22, located on the left 40 and right 42 sides of the valve body 12 respectively, comprise openings in the valve body 12 and respectively define a ball valve channel 14a and an outlet channel 19 which are aligned on a common axis and oppositely faced. The flow control valve orifice 24 comprises an opening on the top side 32 of the valve body 12 and defines a flow control valve channel 18a which is acutely angled upward from the common axis toward the inlet orifice 20. The test valve orifice 26 comprises an opening on the top side 32 of the valve body 12 which is upwardly angled from the common axis at approximately a ninety degree angle and is located between the flow control valve orifice 24 and the outlet orifice 22.

The strainer orifice 28 comprises an opening on the bottom side 34 of the valve body 12 and defines a strainer channel 16a which is acutely angled downward from the common axis toward the outlet orifice 22. The ball valve fitting orifice 30 comprises an opening on the front side 36 of the valve body 12 which is outwardly angled from the common axis at approximately a ninety degree angle and is located on the ball valve channel 14a between the inlet orifice 20 and the connector channel 15.

As shown in FIGS. 2 and 3, the ball valve assembly 14 comprises a conventional isolation ball valve arrangement assembled in the ball valve channel 14a of the valve body 12 near the inlet orifice 20. Two packing washers 44a and 44b are placed in the ball valve channel 14a of the valve body 12 through the inlet orifice 20 with a ball valve 46 movably seated between them. The ball valve 46 is movable from an open position to a closed position and vice versa by a handle 70 to be described later. An inlet fitting 50 holds the packing washers 44a and 44b and the ball valve 46 in place in the channel 14a of the valve body 12. The inlet orifice 20 of the valve body 12 has inner threads 52 and inlet fitting 50 has matching outer threads 54 for attaching the inlet fitting 50 to the valve body 12. The inlet fitting 50 also has inner threads 56 for attaching the device 10 to an inlet pipe (not shown). The inlet fitting may be any one of a variety of sizes to connect to a variety of sizes of inlet pipes. The packing washers 44a and 44b and a ring 48 provide tight seals between: (1) the valve body 12 and the ball valve 46; (2) the ball valve 46 and the inlet fitting 50; and (3) the inlet fitting 50 and the valve body 12.

In addition, a shaft 58 engages the ball valve 46 through the ball valve fitting orifice 30. A washer 60 and a fitting 62 hold the shaft 58 in place. The ball valve fitting orifice 30 has inner threads 64 and fitting 62 has matching outer threads 66 for attaching the fitting 62 to the valve body 12. Furthermore, a screw 68 attaches a handle 70 to the shaft 58 thereby providing means for manipulating the position of the shaft 58 thereby manipulating the position of the ball valve 46. The shaft 58 has inner threads 72 and the screw 68 has matching outer threads 74 for attaching the screw 68 (and the handle 70) to the shaft 58.

Also shown in FIGS. 2 and 3, the strainer assembly 16 comprises a strainer 76 which is placed in the strainer channel 16a of the valve body 12 through the strainer orifice 28 and is held in place in the strainer channel 16a by a threaded cap 80. The strainer orifice 28 has inner threads 82 and the threaded cap 80 has matching outer threads 84 for attaching the threaded cap 80 to the valve body 12 thereby holding the strainer 76 in the valve body 12. A washer 78 is disposed between the valve body 12 and the threaded cap 80 and provides a seal between the threaded cap 80 and the valve body 12. The threaded cap 80 includes a test port 86 and a strainer fitting 88 for providing access to fluid in the valve body 12 without disassembling the device 10. The test port 86 includes inner threads 90 and the strainer fitting 88 includes matching outer threads 92 for attaching the strainer fitting 88 to the threaded cap 80.

The strainer fitting 88 provides the device 10 with blow down capability for flushing out debris accumulated in the strainer 76. By closing the ball valve assembly 14 thereby preventing fluid flow through the inlet 20 and removing the strainer fitting 88 from the test port 86, a reverse fluid flow through the device is created which forces any debris collected in the strainer 76 out the test port 86. A small ball valve (not shown) may be used in place of the strainer fitting 88 to facilitate back flushing the strainer 76 in this manner.

FIGS. 2 and 3 show that the fluid flow control assembly 18 comprises a flow control cartridge 94 which is placed in the flow control valve channel 18a of the valve body 12 through the flow control valve orifice 24 and is held in place by a spring 96 and a cap 98. A washer 100 and a ring 102 are, respectively, placed between the flow control cartridge 94 and the valve body 12 and between the spring 96 and the cap 98. The washer 100 and ring 102 provide seals between the components of the flow control assembly 18.

The flow control assembly 18 is located in the flow control valve channel 18a of the valve body 12 in such a way that the flow control assembly 18 is easily accessible and the flow control cartridge 94 of the flow control assembly 18 may be easily removed and/or replaced without taking the fluid flow control device 10 off-line. Thus, the fluid flow exiting the flow control device 10 can be altered without taking the device 10 off-line.

In addition, the strainer 76 and the flow control cartridge 94 can be removed thereby enabling the device 10 to be subjected to an excessive flow for the purposes of flushing out the device 10 without clogging the strainer 76 or the cartridge 94. After the device 10 is sufficiently flushed, the strainer 76 can be replaced and the flow control cartridge 94 can be replaced with either the same or a different flow control cartridge 94.

Flow through the assembly 18 is generally tamper resistant due to the fact that the flow control cartridge 94 is generally contained within the assembly 18 and the cartridge 94 is pre-set and is preferably pressure compensating to allow a certain flow.

The flow control valve orifice 24 includes inner threads 104 and the cap 98 has matching outer threads 106 for attaching the cap 98 to the valve body 12 thereby holding the flow control cartridge 94 in place by holding the spring 96 against it. The cap 98 includes a test port 108 and a first test valve fitting 110 for providing access to fluid in the valve body 12 without disassembling the device 10. The test port 108 includes inner threads 112 and the first test valve fitting 110 includes matching outer threads 114 for attaching the first test valve fitting 110 to the cap 98.

Shown further in FIGS. 2 and 3, the test valve orifice 26 includes inner threads 116 and a second test valve 118 which has matching outer threads 120 for attaching the second test valve 118 to the valve body 12. As mentioned above, the test valve orifice 26 provides a port through which fluid interior to the valve body 12 and beyond the flow control assembly 18 may be tested. The second test valve 118 provides such access without dismantling the entire device 10.

Also shown in FIGS. 2 and 3, the outlet orifice 22 includes an outlet fitting 122 which is held in place by a coupling 124. The outlet orifice 22 has outer threads 126 and the coupling 124 has matching inner threads 128 for attaching the coupling 124 to the valve body 12 thereby holding the outlet fitting 122 in the valve body 12. A washer 130 is situated between the valve body 12 and the outlet fitting 12 and provides a seal. The coupling 124 can be a union or a compression fitting to allow, with the outlet fitting 122, ease of installation of the device 10 and connection to different sized pipes (not threaded), or a threaded outlet fitting could be used.

Figure 4:
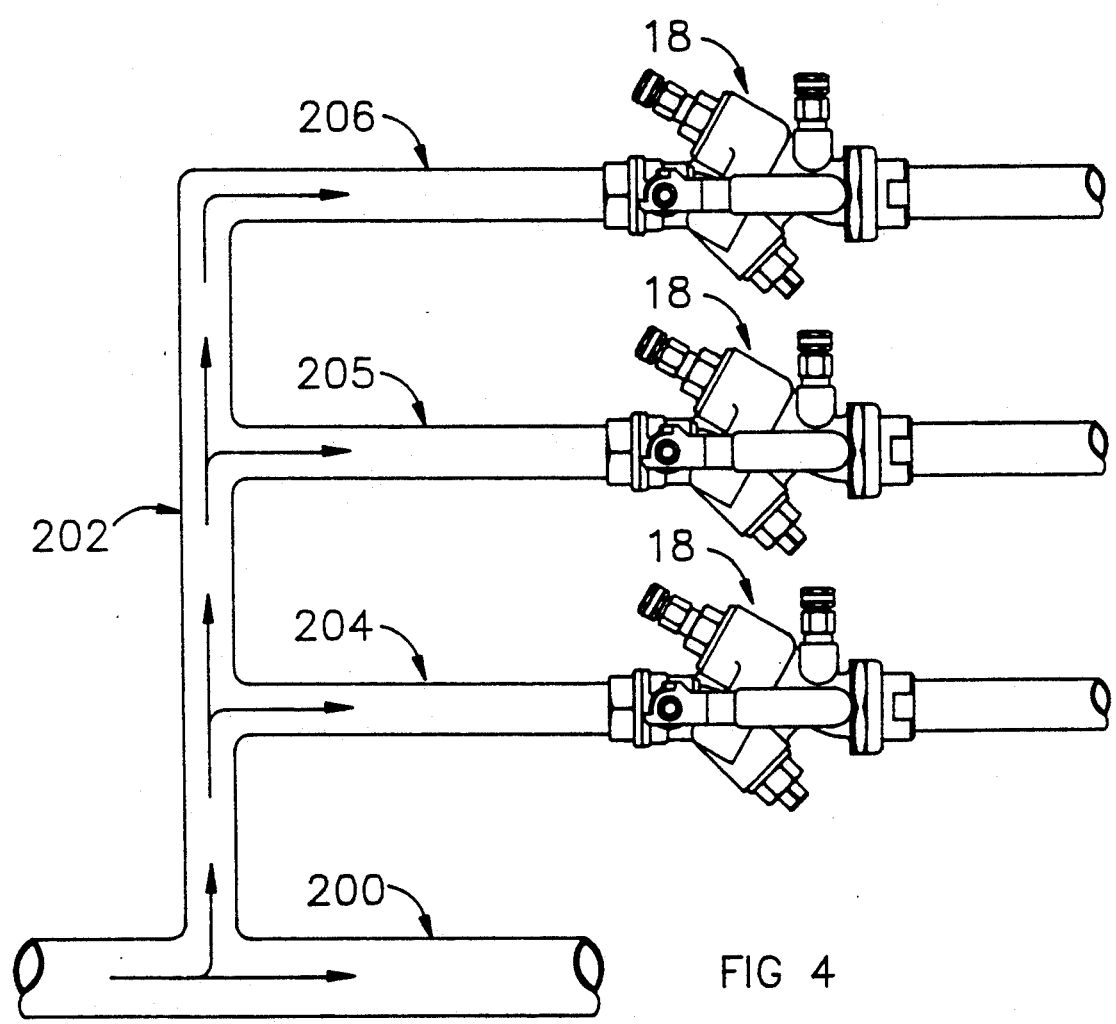
FIG. 4 is a diagrammatic view of a system comprising a plurality of the devices of FIG. 1A.

A plurality of flow control assemblies 18 can be used together in a plumbing system (FIG. 4) comprising an arrangement of pipes and valves, such as supply line 200, line 202 and individual branch lines 204–206 with valves 18 (supplying, for example, radiators in a building). For example, separate assemblies 18 can be used to regulate flow to different rooms or to different floors of a facilities' plumbing system. FIG. 4 shows an example of such a system. As described above, this system has the benefit of enabling easy flushing through excessive flow because the strainers 76 and flow control cartridges 94 can be easily removed from the flow control devices 10.

While an embodiment of the present invention has been shown and described, various modifications may be made without departing from the scope of the present invention, and all such modifications and equivalents are intended to be covered.

What is claimed is:

1. A method of plumbing a facility with a plurality of fluid flow control devices having a unitary body and including a strainer and a flow control cartridge comprising the steps of
   (a) installing in a plumbing system a plurality of fluid flow control devices with the strainers and flow control cartridges removed,
   (b) providing excessive fluid flow to the plumbing system to flush the plumbing, and
   (c) installing the strainers and flow control cartridges into the fluid flow control devices.

2. A method of plumbing a facility with a plurality of fluid flow control devices having a unitary body and including a strainer and a flow control cartridge comprising the steps of
   (a) installing in a plumbing system a plurality of fluid flow control devices,
   (b) removing the strainers and flow control cartridges from the installed devices,
   (c) providing excessive fluid flow to the plumbing system to flush the plumbing, and
   (d) replacing the strainers and flow control cartridges into the installed devices.

3. A method of plumbing a facility with a plurality of fluid flow control devices having a unitary body and including at least one flow member comprising the steps of
   (a) installing in a plumbing system a plurality of fluid flow control devices with the flow members removed,
   (b) providing excessive fluid flow to the plumbing system to flush the plumbing, and
   (c) installing the flow members into the fluid flow control devices.

4. The method of claim 3 wherein the at least one flow member comprises a flow control valve.

5. The method of claim 3 wherein the at least one flow member comprises a flow control valve and a strainer.

* * * * *